April 29, 1969 H. H. NAIDICH ET AL 3,441,346
LINE ACCURACY ENHANCER
Filed March 7, 1966
FIG. 1.
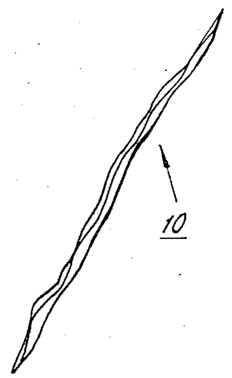
FIG. 2a.
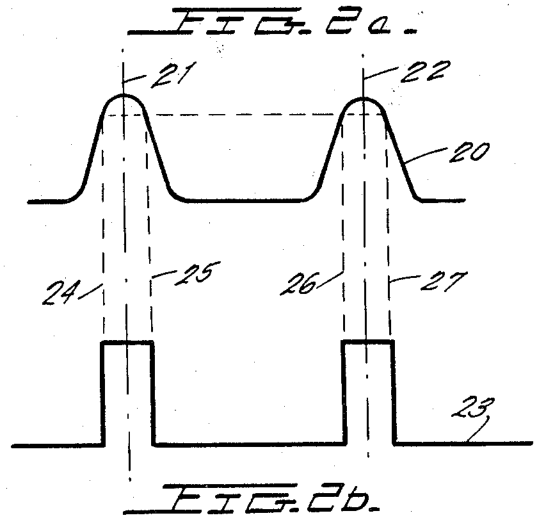
FIG. 2b.
FIG. 4.
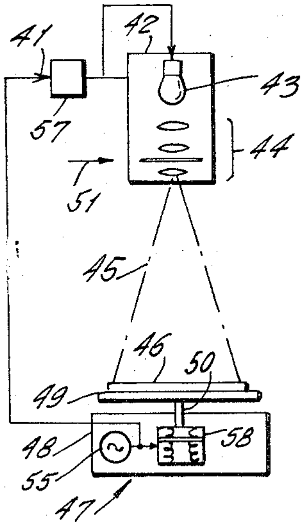
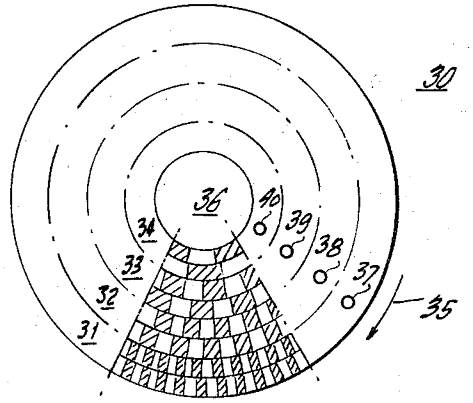
FIG. 3.
FIG. 5.
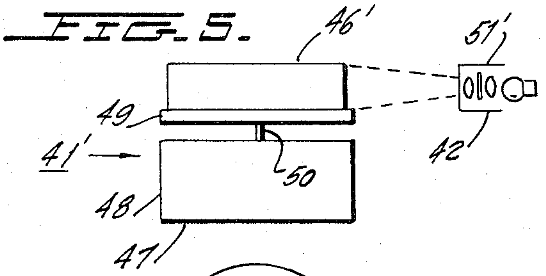
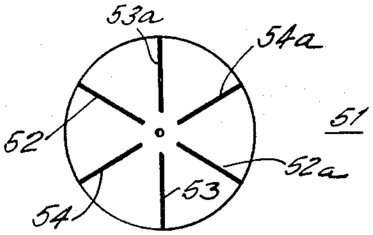
FIG. 4a.
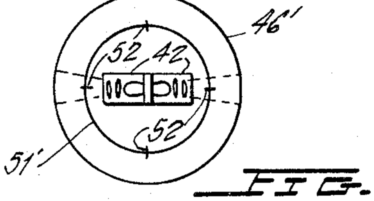
FIG. 5a.
INVENTORS
JOHN T. MEALY
HERBERT H. NAIDICH
BY
OSTROLENK, FABER, GERB & SOFFEN
ATTORNEYS United States Patent Office 3,441,346

Patented Apr. 29, 1969

3,441,346

LINE ACCURACY ENHANCER

Herbert H. Naidich, Rego Park, and John T. Mealy, Bayside, N.Y., assignors to Kollsman Instrument Corporation, Elmhurst, Queens, N.Y., a corporation of New York Filed Mar. 7, 1966, Ser. No. 532,293
Int. Cl. G03b *27/50*
U.S. Cl. 355—77 3 Claims

ABSTRACT OF THE DISCLOSURE

A method for producing an encoder sheet having alternating transparent and opaque sections with a high degree of definition between adjacent sections. The method utilizes photosensitive material having a sharp exposure saturation threshold characteristic. A master is machined with a predetermined pattern of lines and light energy is passed through the master to focus in a corresponding pattern of line positions on the photosensitive material. The photosensitive sheet is moved relative to the master to register the pattern of line positions with different lines and another exposure is made. This process is repeated to superimpose the successive line exposures a number of times before saturation of the exposed photosensitive material. The number of superimposed exposures before saturation increases the degree of definition of the line positions.

The instant invention relates to code wheels and the like, and more particularly to highly accurate code disks and a method for producing same.

Optical encoding disks which are typically employed as one integral element in analog-to-digital converting devices, trigonometric function generating devices, and the like, are typically comprised of an encoder disk having alternating opaque and transparent or translucent radial sections or lines. A light source is normally provided on one side of the code disk which is normally rotated by a servo or other suitable type of motor. Suitable photoelectric cells are provided on the opposite side of the code disk which detect the pulsating light rays caused by the movement of the alternating transparent and opaque sectors of the disk across the light ray source. For a given encoder disk diameter, various state of the art techniques exist for scribing the maximum number of accurate equi-spaced and positioned line pairs. This is typically accomplished by machine dividing the 360° of the disk into the maximum number of lines consistent with the capabilities of the scribing machine.

A high quality disk will exhibit errors in the angular position of each line, which errors are largely random in nature. The higher the quality of the disk, the smaller this random variation ($\delta$) will be. Also, the scribe lines will evidence some roughness or jaggedness as well as waviness which occurs as a function of the practical limitations of the manufacturing process.

The instant invention is characterized by providing an encoder disk and process for manufacturing same which greatly enchances the accuracy and definition of the alternating opaque and translucent or transparent disk sectors through the use of a multiple exposure and developing process which greatly enhances the accuracy and contrast of the alternating transparent and opaque sectors.

The encoder disk-forming process is comprised of the steps of providing a master disk which is machined to the maximum possible accuracy and sharpness consistent with present-day technology. The master disk is provided with one or more pairs of radially oriented slits with each pair of slits being arranged along one diameter of the disk. A disk formed of suitable photosensitive material is then mounted upon a turntable which is capable of being rather accurately indexed. The master disk is mounted within an enlarger device or other suitable means provided with a light source and a lens system for focusing the pairs of slits upon the surface of the photosensitive material. If the master disk has N line pairs, and if the photosensitive material is rotated through incremental steps wherein each step is equal to 360 divided by N degrees, after indexing through the total number of incremental steps, the result obtained is multiple superimposed exposure of the radial line pattern. As the photosensitive material adds (or integrates) the multiple exposures, when sufficient samples have been taken, the cumulative exposure of each line segment assumes the kell-known statistical Gaussian-shaped curve whose dimensions are a function of the variants of the radially elongated slits provided on the master disk. As is well known, the contrast and accuracy increases as the number of samples is increased so long as the photosensitive material is not saturated by the cumulative light of the multiple exposures. The type of photosensitive material is selected so that in conjunction with the developing process, a sharp threshold of exposure is exhibited. The developed film is now a replica of the master image with the accuracy of each individual line improved by the statistical averaging, and the edges of each line are sharpened by the averaging process plus a light clipping process which is performed during the multiple exposure operation.

The exposure procedure can be fully automated by providing a motor driven turntable for the photosensitive material which is controlled by a motor receiving an input signal of a predetermined frequency *f*. This frequency signal is then employed for the purpose of energizing the light source in a strobing fashion. The reference frequency signal can be divided to drive the table at the proper speed or it can be derived by multiplying the frequency of the source which drives the turntable through the use of well-known phase-locking techniques.

A linear grating or line pattern may be derived by providing an elongated sheet of photosensitive material, curling it to form a substantially cylindrical shape, mounting it upon the turntable, and mounting the master linear grating concentrically therewith. Either the master or photosensitive material is held stationary while the other is rotated. The grating image is focused on the photosensitive material, and the light is controlled either manually or automatically by a strobing process, as previously described, in order to produce the statistically formed pattern. The use of multiple exposures to produce an optimum number of superimposed line exposures enhances definition so that an extremely accurate code disk, having excellent definition properties, can be produced.

It is, therefore, one object of the instant invention to provide a novel code disk having extremely high angular positional accuracy as compared with code disks produced through the use of conventional techniques.

Another object of the instant invention is to provide a code disk having enhanced definition properties and a method for producing same.

Another object of the instant invention is to provide a novel code disk having alternating radially aligned transparent and opaque sectors exhibiting extremely enhanced definition and angular positional accuracy therebetween.

Still another object of the instant invention is to provide a novel method for producing code disks comprised of alternating opaque and transparent sectors of extremely enhanced definition and angular positional accuracy which are formed by exposing the code disk, which is formed of a suitable photosensitive material, a number of times to produce a plurality of superimposed line patterns and setting the exposure threshold in order to greatly enhance the code wheel line definition when compared with conventional techniques.

These and other objects of the instant invention will become apparent when reading the accompanying description and drawings in which:

FIGURE 1 is a plan view showing the resultant line pattern obtained from a plurality of superimposed exposures.

FIGURE 2*a* is a curve showing the Gaussian distribution for cumulative exposures.

FIGURE 2*b* is a curve showing the resulting enhanced line pattern obtained through the use of the multiple exposure and clipping techniques of the instant invention.

FIGURE 3 is a plan view of a typical code wheel which may be formed through the use of the method of the instant invention.

FIGURE 4 is an elevational view showing the apparatus which map be employed for producing code disks in accordance with the principles of the instant invention.

FIGURE 4*a* is a plan view of a master disk which can be employed in the apparatus of FIGURE 4.

FIGURE 5 shows an alternative apparatus arrangement for producing linear grating patterns in accordance with the principles of the instant invention.

FIGURE 5*a* shows a top view of the apparatus of FIGURE 5.

Referring now to the drawings, FIGURE 3 shows a typical code disk 30 which is shown as being comprised of four concentric rings 31 through 34 with each ring being comprised of radially aligned sectors or areas which alternate from transparent (i.e., the white region) to opaque (i.e., the shaded regions) conditions. The code wheel 30 is normally operated by rotating it, for example, in the direction shown by arrow 35 about its center 36, and providing suitable light sources (not shown) associated with each concentric ring 31 through 34 with the alternating light passage and light blockage patterns being picked up by suitable photoelectric sensing devices 37 through 40, respectively.

It can clearly be seen that the outermost concentric ring 31 is provided with alternating transparent and opaque sectors which are extremely thin, thereby requiring extremely accurate contrast at the line between transparency and opaqueness in order to enhance the operating capabilities of the code wheel. In addition thereto, the other sectors require extremely sharp contrast between adjacent opaque and transparent sectors to still further enhance the accuracy of the code wheel.

In order to further enhance and improve code disks beyond the capabilities of conventional machine techniques, the method and apparatus, as shown in FIGURES 4 and 4*a*, may be employed. In order to so produce code disks of enhanced accuracy, a master disk 51 is provided which is machined in accordance with present-day techniques so as to provide a plurality of pairs **52–52*a* through 54–54*a* of elongated slits which are very accurately formed and spaced about the disk 51. While three such pairs are provided in disk 51**, it should be understood that a greater or lesser number of such line pairs may be provided depending only upon the diameter of the code wheel and the use to which the code wheel is applied.

Th master disk 51 is then mounted within an enlarger or other suitable focusing device 42 which is comprised of a light source 43 and a focusing lens system 44 for focusing the passing light rays 45 upon the surface of a disk 46 formed of a suitable photosensitive material.

The disk 46 is mounted upon a turntable apparatus 47 comprised of a turntable base 48 containing the turntable electronics (i.e., motor and so forth) which is coupled to the turntable 49 through a suitable shaft or other driving means 50.

In order to produce a pattern analogous to that shown in the code wheel 30 of FIGURE 3, let it be assumed that the master disk 51 is provided with the three line pairs **52–52*a* through 54–54A, shown in FIGURE 4. With these line pairs being equally spaced, each line will form a 60° angle with the closest angularly positioned line. For example, there will be a 60° angle formed between the intersection of lines 54*a* and 52*a*, 52*a* and 53, 53 and 54, and so forth. The turntable apparatus 47 will then be operated either through its electronics or manually so as to rotate the turntable 49 through an angular rotation of exactly 60° after each exposure. For example, before any rotation, the photosensitive disk 46 will be exposed. The length of exposure time is dependent upon the sensitivity characteristics of the photosensitive sheet 46, the light intensity of the light source 43, and the width of the slits 52 through 54—52*a* hrough 54*a*. Exposure time will also be controlled so as not to saturate the photosensitive material 46 with light. After the first exposure, the turntable 49 is then rotated through an angle of 60° and exposed a second time. This will cause a second line pattern to be substantially superimposed upon the first line pattern. The turntable will then be rotated through another 60° arc causing a third line pattern to be superimposed upon the first and second line patterns. After a suitable number of such exposures, the photosensitive material may then be removed from the turntable 49** and developed using appropriate developing techniques and materials.

The multiple exposure process may be fully automated by providing turntable electronics comprised of a suitable signal source 55 of a reference frequency *f* which is coupled through either frequency dividing or frequency multiplying means 57 to light source 43 in order to properly "strobe" the light source used for exposing the photosensitive film 46. The reference signal source 55 is also coupled through suitable frequency dividing or multiplying means 56 to motor 58 which operates to rotate turntable 49 through coupling shaft 50. Through proper selection of the frequency dividing or multiplying means 56 and 57, the light source 43 may be strobed as the turntable rotates through an angle of 360 divided by N degrees, where N is equal to the number of line pairs provided on the master disk 51. Well-known phase locking techniques may be employed between ilght source 43 and turntable 49 so as to insure synchronism therebetween. A suitable mass may be added to turntable 49 to reduce turntable "wow and flutter" to insure a uniform rotational rate. One suitable turntable apparatus which may be employed is the Reeves Instrument Corporation Gyro Test Table, Model RD made by the Reeves Instrument Corporation of Garden City, N.Y. The Gyro Test Table has a positioning accuracy of 2 seconds of arc, and is provided with suitable means for data take-off for the purpose of synchronizing the light source 43 shown in FIGURE 4 with turntable rotation.

While the embodiment of FIGURE 4 shows the master disk 51 as being held stationary while the photosensitive material 46 is rotated, it should be clearly understood that the master disk may be rotated upon a suitable turntable and the photosensiive material 46 may be held stationary.

If it is desired to produce a code wheel of the type designated by the numeral 30 in FIGURE 3, it should be clearly understood that the line pairs provided on the master disk 51 may be formed to provide the same concentric ring pattern of the code disk 30, and the photosensitive material may be subjected to multiple exposures in the same manner as previously described. As an alternative, a master disk may be formed for each of the concentric rings of the code wheel 30, and each master disk may then be inserted separately into the light focusing apparatus 42 to finally produce all of the concentric ring patterns, as shown in FIGURE 3.

FIGURE 1 shows a typical superposition of one line position 10 which has had several exposures. The waviness of each individual line as well as its jaggedness, or roughness, is a function of the practical limitations of the machining process for forming the line pairs in the master disk. As the photosensitive material adds (or integrates) the multiple exposures, and once sufficient samples have been taken, the accumulative exposure of the superimposed line segments assumes the well-known statistical Gaussian shape, as shown by the curve 20 of FIGURE 2*a* wherein the dimensions of the curve are a function of the variance of the lines on the original master disk. The vertical guide lines 21 and 22 represent the actual line positions for two adjacent lines. Maximum sharpness for each line is represented by the highest points of the curve 20 which substantially conform with the location of the actual line positions 21 and 22, i.e., where the curve 20 intersects with the vertical dotted lines 21 and 22. Contrast or sharpness drops off in accordance with the Gaussian curve in the manner shown in FIGURE 2*a*.

In accordance with the invention, the definition accuracy will increase as the number of exposures is increased so long as the photosensitive material does not become saturated by the cumulative light exposures. The type of photosensitive material is selected so that, in conjunction with the developing process, it exhibits a sharp threshold of exposure. There are many suitable photosensitive materials which can be employed. One preferable material which may be employed is Spectroscopic Plate Type 649–0 which is rated at greater than 2,000 lines per millimeter and as having "extremely high contrast." Other suitable materials may be employed. For example, refer to the publication entitled "Kodak Plates and Films" produced by the Kodak Corporation. The basic photographic technology is covered in many sources, and a suitable reference is "Fundamentals of Photographic Theory" by James Higgins, published by Morgan & Morgan, copyright 1960.

Through the use of the suitable sensitive material exposure timing and developing techniques, the developed photosensitive material will now be a replica of the master disk with the accuracy of each individual line improved by the statistical averaging process, while the edges of the lines will be sharpened by the averaging-plus-clipping process performed during the photo processing. The clipping process is primarily constituted of controlling exposure times to permit saturation of the film over the total number of multiple exposures. The resulting enhancement can be seen from a consideration of FIGURE 2*b* which shows a curve 23 which is extremely well squared off at the vertical lines 24–25 and 26–27 simply by virtue of proper selection of the threshold level 28, shown in FIGURE 2*a*, which is primarily located by control over the type of photosensitive material employed and the control of the exposure time for each of the multiple exposures.

The limits of resolution for a particular disk diameter are N lines pairs and are determined by the practical capabilities of the machining techniques employed. If the rotation of the photosensitive material is indexed by angular increments equal to 360 divided by 2N degrees between exposure of the film, the exposed film will contain 2N Gaussian patterns, and after the photo processing, the film will evidence a clean, sharp 2N line pattern. Thus, it is possible to provide a line pattern of greater than the number of lines provided on the master disk simply by appropriate indexing of the turntable. The factor two can be increased to obtain a disk of XN line pairs with the maximum number of lines XN being determined by the resolution limits of the film and the attending film processing.

In order to obtain a linear divided line pattern rather than a radial line pattern, as was previously described with reference to FIGURES 4 and 4*a*, the apparatus of FIGURES 5 and 5*a* may be employed. The apparatus 41′ of FIGURES 5 and 5*a* is analogous to that shown in FIGURE 4 in that a turntable apparatus 47 is provided having a turntable 49 coupled to the turntable electronics 48 through shaft means 50. However, the arrangement of FIGURE 5 differs from that of FIGURE 4 in that the sensitized film is comprised of a substantially elongated rectangular-shaped sheet which is curled into a cylindrical shape 46′, and is then suitably mounted in this position upon the turntable 49. The master sheet 51′ is then mounted either internally or externally to the photosensitive cylinder 46′ and is focused by the light focusing assembly 42 onto the sensitized surface of the cylinder 46′. The cylinder 46′ is then incrementally stepped by the turntable 49 until a suitable number of multiple superimposed exposures are obtained. It should be clearly understood that a plurality of such light focusing assemblies 42 may be arranged in a regular pattern around the photosensitive cylinder 46′ to reduce the total number of indexing steps required.

If desired, the slightly modified arrangement of FIGURE 5*a* may be employed wherein the light focusing apparatus 42 and the master sheet 51′ are mounted concentrically and internally of the photosensitive cylinder 46′ with one of the master or photosensitive materials being held stationary while the other is rotated and indexed to form the superimposed line pattern.

While only two light focusing means are shown in FIGURE 5*a* and only one is shown in FIGURE 5, it should be clearly understood that as many devices as required may be employed.

As a still further embodiment, the light focusing arrangement may be comprised of an omnidirectional light source positioned at the center of a master sheet with suitable light focusing means being provided at each of the master sheet 51′ to lie practically upon the photosensitive cylinder 46′. It may be then moved while the remainder is held stationary in order to form the superimposed pattern. Light exposure can be controlled so as to minimize line thickness and enhance the contrast in adjacent transparent and opaque sectors in accordance with the techniques previously described.

It can clearly be seen from the foregoing that the instant invention provides a novel code wheel or linear grating device and method for producing same in which line accuracy of the resulting device is greatly enhanced through the use of a multiple exposure and clipping process.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A method for producing a sheet having alternating transparent and opaque sectors with a high degree of definition between adjacent sectors comprising the steps of:

(a) providing a master disk;

(b) machining N line pairs into said master disk each being arranged along a common diameter, where N is a real integer;

(c) providing a sheet of photosensitive material;

(d) passing light rays through the N line pairs in said master disk for a predetermined interval of time;

(e) focusing said light rays on the surface of said sheet;

(f) rotating said sheet relative to said master disk through an angle that is an integral multiple of 180/N;

(g) repeating steps (d) through (f) at least once to form at least two substantially identical line patterns superimposed upon one another;

(h) developing said exposed photosensitive sheet.

2. A method for producing a sheet having alternating transparent and opaque sectors with a high degree of definition between adjacent sectors comprising the steps of:

(a) providing a master sheet curled into a closed loop shape;
(b) machining N line pairs into said master sheet each being arranged to lie perpendicular to a common line joining points on said loop which are opposite one another, where N is a real integer;
(c) providing a sheet of photosensitive material adjacent said master sheet;
(d) passing light rays through the machined lines in said master sheet for a predetermined time interval;
(e) focusing said light rays on the surface of said photosensitive sheet;
(f) moving said photosensitive sheet relative to said master sheet by a predetermined amount;
(g) repeating steps (d) through (f) at least once to form at least two substantially identical line patterns superimposed upon one another;
(h) developing said exposed photosenstive sheet.

3. A method for producing a sheet having alternating transparent and opaque sectors with a high degree of definition between adjacent sectors comprising the steps of:

(a) providing a pattern of successive, uniformly spaced, side-by-side disposed, light transmitting line regions in a master,
(b) locating a sheet of a photosensitive material of sharp exposure saturation threshold characteristic in predetermined relation to the master,
(c) passing light ray energy of less than the initial saturation threshold level of said material through the line regions in the master to focus at corresponding line positions on the sheet,
(d) moving the sheet relative to the master to substantially register said line positions with different ones of said line regions,
(e) repeating steps (c) and (d) to superimpose a plurality of line-like light patterns at each line position before saturating the photosensitive material whereby the sharpness of definition of the line positions is determined by the number of times a light pattern is superimposed thereat, and
(f) developing said exposed photosensitive sheet.

References Cited

UNITED STATES PATENTS

| | | | |
|---|---|---|---|
| 2,773,413 | 12/1956 | Schade | 88—24 |
| 2,924,138 | 2/1960 | Jones | 88—24 |
| 3,181,419 | 5/1965 | Knaup et al. | 88—24 |

NORTON ANSHER, *Primary Examiner.*

W. A. SIVERTSON, *Assistant Examiner.*

U.S. Cl. X.R.

355—27, 40

U.S. DEPARTMENT OF COMMERCE

PATENT OFFICE

Washington, D.C. 20231

UNITED STATES PATENT OFFICE

CERTIFICATE OF CORRECTION

Patent No. 3,441,346

April 29, 1969

Herbert H. Naidich et al.

It is certified that error appears in the above identified patent and that said Letters Patent are hereby corrected as shown below:

Column 6, line 71, "180N" should read -- $\frac{180}{N}$ --. Column 7, lines 24 and and 25, "sectors", each occurrence, should read -- sections --.

Signed and sealed this 14th day of April 1970.

(SEAL)
Attest:

Edward M. Fletcher, Jr.
Attesting Officer

WILLIAM E. SCHUYLER, JR.
Commissioner of Patents